United States Patent [19]

Yamada et al.

[11] Patent Number: 4,758,255
[45] Date of Patent: Jul. 19, 1988

[54] CANISTER FOR ADSORBING FUEL VAPORS

[75] Inventors: Yutaka Yamada, Hekinan; Kazumi Haruta, Obu, both of Japan

[73] Assignee: Aisan Kogyo Kabushiki Kaisha, Ohbu, Japan

[21] Appl. No.: 99,897

[22] Filed: Sep. 22, 1987

[30] Foreign Application Priority Data

Sep. 22, 1986 [JP] Japan ................. 61-225569

[51] Int. Cl.⁴ ............................ B01D 53/04
[52] U.S. Cl. ................. 55/316; 55/387; 55/475; 123/519
[58] Field of Search ........... 55/316, 387, 475, 518; 123/519

[56] References Cited

U.S. PATENT DOCUMENTS

| | | | |
|---|---|---|---|
| 3,728,846 | 4/1973 | Nilsson | 55/316 X |
| 3,831,353 | 8/1974 | Toth | 55/387 |
| 3,838,977 | 10/1974 | Warren | 55/475 X |
| 3,847,574 | 11/1974 | Fish | 55/387 |
| 3,884,204 | 5/1975 | Krautwurst et al. | 55/316 X |
| 4,338,106 | 7/1982 | Mizuno et al. | 55/387 X |
| 4,448,594 | 5/1984 | Kozawa | |
| 4,496,379 | 1/1985 | Kozawa | 55/316 X |

FOREIGN PATENT DOCUMENTS 19188  1/1982  Japan .
123953  2/1982  Japan .

Primary Examiner—Kathleen J. Prunner
Attorney, Agent, or Firm—Cushman, Darby & Cushman

[57] ABSTRACT

A canister for absorbing fuel vapors includes a vapor-absorbing adsorbent layer contained in a cylindrical, laterally-mounted casing, an intake port and a purge port which are provided at one side of the adsorbent material layer, an air port provided at the other side of the adsorbent layer, fixed filters and perforated retaining plates for retaining the two sides of the vapor absorbing material layer, and a device for preventing a space from occurring in the adsorbent layer, the device being provided in an upper wall portion of the casing and including a tubular guide having a lower end opening into the adsorbent layer, a plunger fitted into the guide slidably in the vertical direction, and a spring for urging the plunger downward.

4 Claims, 2 Drawing Sheets

CANISTER FOR ADSORBING FUEL VAPORS

BACKGROUND OF THE INVENTION

1. Field of the Invention

The present invention relates to a canister for adsorbing fuel vapors.

2. Description of the Prior Art

FIG. 6 shows a conventional evaporation control system for limiting the discharge of fuel vapors into the atmosphere, in which the fuel vapors generated in a gasoline tank 1 mounted on a vehicle are collected in a fuel vapor adsorbing canister 4 (hereinafter referred to simply as a "canister") from an intake port 3 through a check valve 2 while the engine is stopped so as to be adsorbed and stored in a vapor adsorbing material, such as activated carbon, filling the canister 4, and in which a source of vacuum generated in an intake manifold 5 is utilized to remove the accumulated fuel vapors from the vapor adsorbing material through a purge port 6 and draw them into the intake manifold 5 for consumption in the engine combustion process while the engine is operating. Such an evaporation control system for limiting fuel vapor discharge into the atmosphere is disclosed in the specifications of, for example, Japanese Unexamined Utility Model Publication No. 123953/1982 and U.S. Pat. No. 3,884,204.

FIG. 7 shows a laterally disposed-type canister employed in the above-described conventional evaporation control system. The canister comprises a lateral cylindrical casing 7, a vapor adsorbing material layer 8 which is, for example, activated carbon, filling the casing; a filter 9 and a fixed, perforated retaining plate 10 which retains one side of the adsorbent layer 8; a filter 11 and a movable, perforated retaining plate 12 which are accommodated in the cylindrical casing 7 at another side opposite to the fixed retaining plate 10 in such a manner that they are slidable in the horizontal direction; and a spring 13 for pressing against the filter 11 and the movable retaining plate 12 to retain the adsorbent layer 8. The canister is also provided with an intake port 14 for fuel vapors, and an air port 15. The above-described type of canister has been disclosed in Japanese Unexamined Utility Model Publication No. 19188/1982.

In this lateral-type canister, if the adsorbent layer 8 is vibrated or the adsorbent layer crumbles, the voids in the adsorbent decreases, thereby decreasing the volume of the adsorbent layer. This creates a space 16 which extends between the two filters 9 and 11 and is formed between the entire upper surface of the descended vapor adsorbent layer 8 and the cylindrical casing 7. In consequence, part of the fuel vapors introduced into an intake chamber 17 from the intake port 14 passes the space 16 and is discharged into the atmosphere through an air chamber 18 from the air port 15 without being introduced in the adsorbent layer (8), with the result that the amount of fuel vapors discharged into the atmosphere increases to pollute the atmosphere. To overcome this problem, as has been described above, the above-described conventional canister is arranged so that the spring 13 constantly presses against the other side of the adsorbent layer 8 through the filter 11 and the movable retaining plate 12, compressing the adsorbent layer 8 so as to prevent the space 16 from occurring. However, the movable retaining plate 12, which is slidable horizontally in its upright state in the above-described manner, tends to become inclined due to vibrations. This inclination leads to an outflow of the adsorbent through a sliding portions defined between the slidable retaining plate 12 and the cylindrical casing 7, or leads to the jamming of the adsorbent therebetween even if a degree of the inclination is small, with the result that the smooth sliding thereof becomes impossible. If the canister is installed at the bottom of the automobile body, flying stones or the like hit the bottom of the canister, deforming the bottom wall thereof and impairing the smooth sliding of the movable retaining plate 12. If the movable retaining plate 12 cannot slide smoothly, the adsorbent layer 8 cannot be effectively pressed by the spring 13, leading to the occurrence of the space. With this type of canister, it is therefore necessary to restrict the position at which the canister is installed or to restrict the orientation in which the canister is installed in an automobile, so as to ensure that the movable retaining plate is not inclined.

SUMMARY OF THE INVENTION

The object of the present invention is to overcome the above-described problems of the prior art by providing a lateral-type canister comprising fixed retaining plates for retaining the two sides of adsorbent layer, and means for preventing a space from occurring within the adsorbent layer, the means being provided in the upper portion of the vapor absorbing material layer.

The canister of the invention comprises: an adsorbent layer contained in a cylindrical, laterally-mounted casing; an intake port and a purge port both provided at one side of the adsorbent layer; an air port provided at the other side of the adsorbent layer; fixed filters and perforated retaining plates for retaining the two sides of the adsorbent layer; and means for preventing a space from occurring in the adsorbent layer, the means being provided in an upper wall portion of the casing and including a tubular guide having a lower end opening into the adsorbent layer, a plunger fitted into the guide slidably in the vertical direction, and a spring for urging the plunger downward.

If the layer 32 of the adsorbent, which was charged when the canister was assembled, is vibrated or if the adsorbent crumbles, the adsorbent becomes more densely packed, with the results that the voids therein decreases and that the volume of the adsorbent layer 32 is reduced. This causes the plunger 34, which is pressed against the adsorbent by the spring, to descend further into the adsorbent layer 32 to thereby prevent a space from occurring between the upper surface of the adsorbent layer 32 and the casing 20, and thereby forcing the adsorbent to completely fill the canister 20. As a result, the upper surface of the adsorbent layer is maintained in contact with the inner surface of the casing, without causing a space therebetween.

DESCRIPTION OF THE PREFERRED EMBODIMENTS

Figure 1:
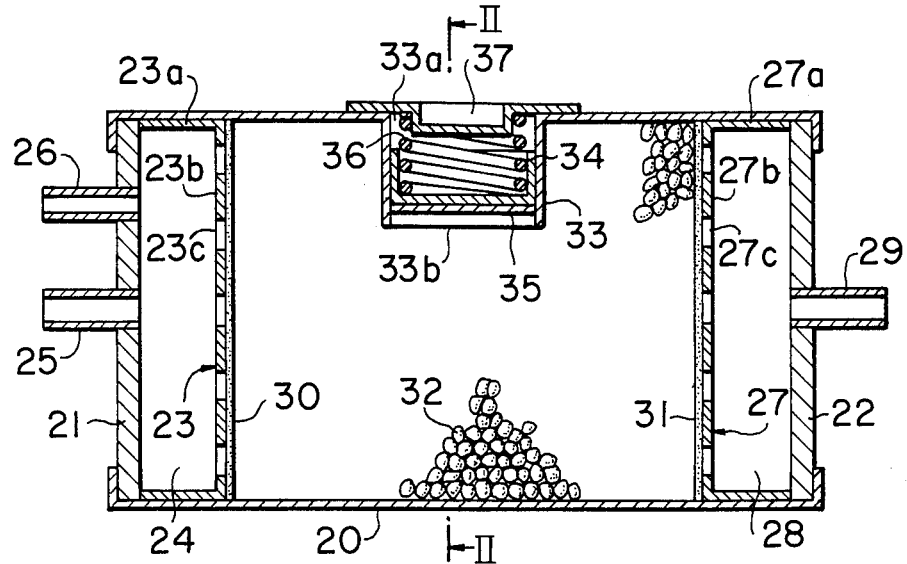
FIG. 1 is a sectional side elevation of a first embodiment of the present invention.
Figure 2:
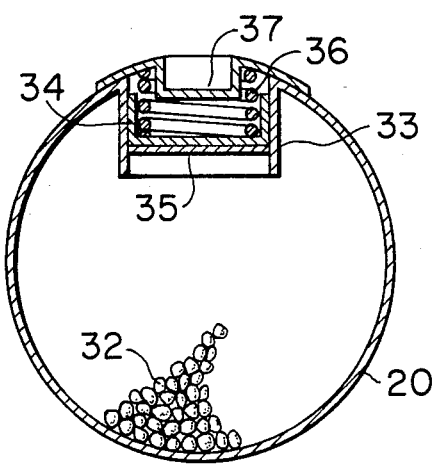
FIG. 2 is a cross-section taken along the line II—II of FIG. 1.

A first embodiment will be hereinunder described with reference to FIGS. 1 and 2.

A cylindrical casing 20 of a canister is of a lateral-type with its axis lying horizontal and has a length of 200-300 mm and a diameter of 100-200 mm. One end of the casing 20 is closed by an intake chamber side cover 21, and the other end thereof, by an air chamber side cover 22. An intake side retaining plate 23 comprises a cylindrical wall 23a having a diameter which allows it to be closely fitted into the casing 20, and a perforated plate 23b with many perforations 23c formed therein, the perforated plate 23b being integrally formed with the wall 23a at one end thereof. The retaining plate 23 is fitted into the casing 20 in such a manner that the open end of the cylindrical wall 23a abuts against the inner surface of the intake chamber side cover 21 so as to form an intake chamber 24 between the perforated plate 23b and the intake chamber side cover 21. The intake chamber side cover 21 is provided with an intake port 25 to the interior of the intake chamber 24 and in communication with a fuel vapor source such as a fuel tank. It also has a purge port 26 to the interior of the intake chamber 24 and in communication with an intake manifold of the engine. An atmospheric air side retaining plate 27 similarly comprises a cylindrical wall 27a, and a perforated plate 27b with many perforations 27c formed therein, the performated plate 27b being integrally formed with the wall 27a at one end thereof. The retaining plate 27 is fitted into the casing 20 in such a manner that the open end of the retaining plate 27 abuts against the inner surface of the air chamber side cover 22 so as to form an air chamber 28 between the perforated plate 27b and the air chamber side cover 22. The air chamber side cover 22 is provided with an air port 29 to the interior of the air chamber 28 and in communication with the atmospheric air around the canister. A filter 30 and a filter 31 are fixed on the inner surfaces of the retaining plates 23 and 27, respectively. They define a space therebetween in which an active vapor absorbing agent is filled to form an adsorbent layer 32. The filter is preferably made of nonwoven fabric having a thickness of 2.5-8 mm and a ventilation resistance not more than 8.5 mm $H_2O$ (in a case of a flow rate of 21 cm/sec). A tubular guide 33 is positioned at the center of the upper portion of the adsorbent layer 32 with its axis directed in the vertical direction. The upper end of the guide 33 is fixed to the inner surface of the upper wall of the casing 20, and the guide 33 is buried in the upper portion of the adsorbent layer 32. An upper end portion 33a of the guide 33 is opened into atmosphere through a window formed in the upper wall of the casing 20, while an lower end portion 33b thereof is opened into the adsorbent layer 32. The inner diameter of the guide 33 is in a range of 40 to 90 mm and is set to be very smaller than that of either of retaining plate 23 and 27. The adsorbent is charged into the interior of the casing 20 through the hollow portion of the guide 33 to fill both the accommodation section formed between the filters 30 and 31 with the exception of the interior of the guide 33 and the lower portion 33b of the guide 33 with the adsorbent to thereby form the adsorbent layer 32. A cylindrical plunger 34 is slidably received in the guide 33. The plunger 34 has a diameter, i.e., a pressure receiving area, which is smaller than the diameter, i.e., the pressure receiving area, of either of the retaining plates 23 and 27. A filter 35 is interposed between the bottom surface of the plunger 34 and the upper surface of the adsorbent filling the lower portion of the guide 33. The outer diameter of the filter 35 is made to be slightly larger than the inner diameter of the guide 33, so that the outer periphery of the filter 35 is closely fitted to the inner surface of the guide 33 so as to prevent the adsorbent from entering between the guide 33 and the plunger 34 and thereby ensure smooth sliding of the plunger 34. A spring 36 is accommodated in the upper portion of the plunger 34 which is placed on the upper surface of the adsorbent layer 32, in such a manner that the upper end thereof is pressed by a cap 37. The cap 37 is hermetically fixed to the upper wall of the casing 20 by welding or the like, so that the plunger 34 is constantly pressed downward by the elastic force of the spring 36 of 5 to 10 kgf. The capacity of the guide 33, which is defined by the lower end of the guide 33 and the lower surface of the filter 35, is selected to be the same value as or slightly larger than the capacity of a space which would be formed between the upper surface of the descended adsorbed layer 32 and the inner surface of the upper wall of the casing 20 when the volume of the adsorbent layer 32 is reduced by vibrations during use.

Figure 3:
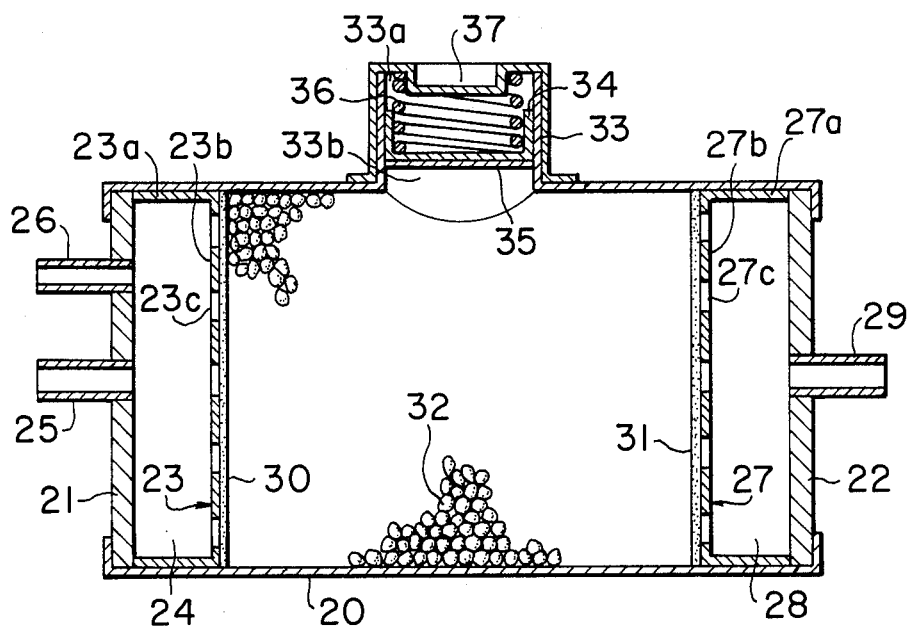
FIG. 3 is a sectional side elevation of a second embodiment of the present invention.

FIG. 3 shows a second embodiment of the present invention. In this embodiment, the guide 33 comprising the plunger 34, filter 35, and spring 36 is not buried in the adsorbent layer 32 in the casing but is provided outside the upper portion of the casing. For other arrangements, the canister of this embodiment is constructed in the same manner as the first embodiment.

Figure 4:
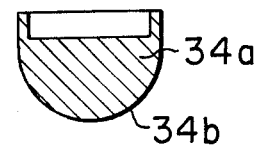
FIGS. 4 and 5 are cross-sectional views of modified examples of a plunger.
Figure 5:
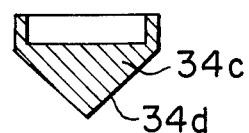
Figure 6:
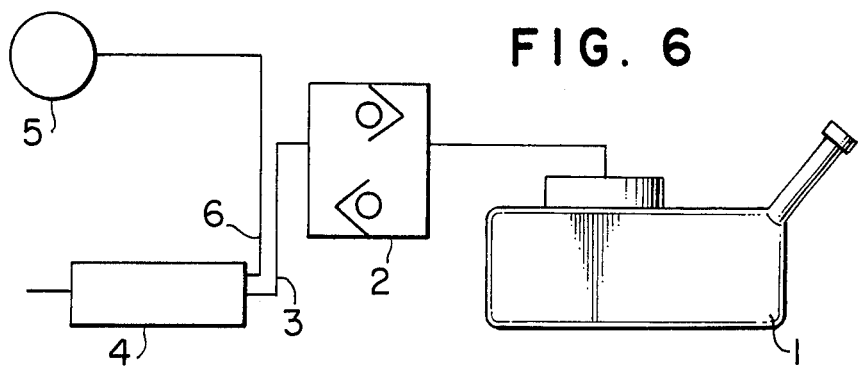
FIG. 6 is a diagram of setting of a canister of this invention.
Figure 7:
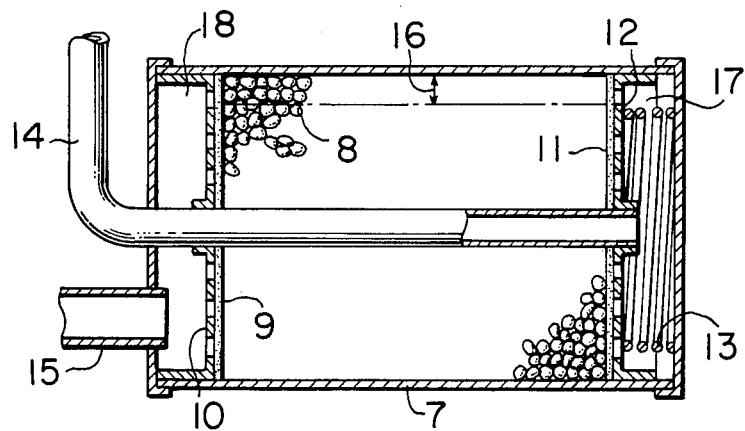
FIG. 7 is a sectional side elevation of a conventional lateral-type canister.

FIGS. 4 and 5 show modified examples of the plunger 34. A plunger 34a shown in FIG. 4 has a hemispherical lower end 34b. A plunger 34c shown in FIG. 5 has a conical lower end 34d. The hemispheral lower end 34b or conical lower end 34d enables the descendant force of the plunger 34a or 34c to be easily transferred to the adsorbent located near it.

As can be seen from the foregoing description, when the volume of the adsorbent layer decreases in the lateral-type canister due to vibration or breakage, the occurrence of space between the upper surface of the vapor adsorbing agent layer and the inner surface of the casing can be prevented by the descent of the plunger, according to the present invention. This can prevent part of fuel vapors collected through the intake port from passing a vacant space and from being discharged into the atmosphere from the air port. Further, since the plunger descends within the guide while keeping a horizontal state thereof, the possibility of the plunger becoming inclined by vibrations is decreased which inclination impairs the sliding thereof. The possibility of the jamming of adsorbent between the sliding surfaces of the plunger and the guide can also be decreased. The movement of the plunger in the direction of gravity ensures a smooth descent of the plunger and effective pressing of the adsorbent. These can in turn reduce restrictions on the position in which the canister is mounted on the automobile, increasing the degree of freedom of installation. The provision of the plunger in the upper portion of the casing decreases the possibility of the plunger being damaged by flying stones while the automobile is running, thereby decreasing the likelihood of the plunger failing even if the casing is deformed by flying stones.

In the present invention, the pressure receiving area of the plunger is selected to be smaller than that of any of the perforated retaining plates provided on the two sides of the adsorbent layer. This enables the load of a pressing spring to be set to a value which is smaller than that for the movable retaining plate 12 of the conventional canister, to ensure that the same pressure is applied to the adsorbent layer. In consequence, the assembly process can be simplified, and the production cost can be reduced. Furthermore, the means for preventing a vacant space from occurring in the adsorbent layer is provided outside the upper wall of the casing, with the result that the same capacity of the adsorbent layer as that in the known canister can be maintained, in spite of the fact that the canister is provided with a vacant space preventing means. The provision of a hemispherical or conical lower end to the plunger enables the downward force of the plunger to be easily transferred to the adsorbent located near it, decreasing the possibility of the generation of a vacant space between the upper surface of the adsorbent layer and the inner surface of the casing.

What is claimed is:

1. A canister for absorbing fuel vapors, comprising:
   a vapor-absorbing adsorbent layer contained in a cylindrical, laterally-mounted casing;
   an intake port and a purge port which are provided at one side of said adsorbent layer;
   an air port provided at the other side of said adsorbent layer;
   fixed filters and perforated retaining plates for retaining the two sides of said adsorbent layer; and
   means for preventing a space from occurring in said adsorbent layer, said means being provided in an upper wall portion of said casing and including a tubular guide having a lower end opening into said adsorbent layer, a plunger fitted into said guide slidably in the vertical direction, and a spring for urging said plunger downward.

2. A canister for absorbing fuel vapors according to claim 1, wherein said means for preventing the space from occurring in the adsorbent layer is provided outside of the upper wall of said casing.

3. A canister for absorbing fuel vapors according to claim 1, wherein a pressure-receiving area of said plunger is selected to be smaller than that of said perforated retaining plates.

4. A canister for absorbing fuel vapors according to claim 1, wherein said plunger has a hemispherical or conical lower end.

* * * * *